United States Patent [19]

Staudinger et al.

[11] 4,051,226
[45] Sept. 27, 1977

[54] PREVENTION OF EXPLOSIVE MIXTURES IN THE REGENERATION OF SULFUR OXIDE ACCEPTORS

[75] Inventors: Gernot Staudinger; Jaap E. Naber, both of Amsterdam, Netherlands

[73] Assignee: Shell Oil Company, Houston, Tex.

[21] Appl. No.: 685,823

[22] Filed: May 12, 1976

Related U.S. Application Data

[63] Continuation of Ser. No. 555,322, March 4, 1975, abandoned.

[30] Foreign Application Priority Data

Mar. 5, 1974 Netherlands .......................... 7402928

[51] Int. Cl.$^2$ .......................... C01B 17/00; B01J 8/00
[52] U.S. Cl. ...................................... 423/244; 169/12; 252/411 S; 55/73
[58] Field of Search .................. 423/244, 248; 169/12; 252/411 S; 55/73

[56] References Cited

U.S. PATENT DOCUMENTS

| 3,501,897 | 3/1970 | Van Helden et al. ............... 423/244 |
| 3,781,407 | 12/1973 | Kamijo et al. ........................ 423/244 |
| 3,832,445 | 8/1974 | Kouwenhoven et al. ........... 423/244 |
| 3,899,099 | 8/1975 | Oiestad ................................. 423/242 |

FOREIGN PATENT DOCUMENTS 1,089,716  11/1967  United Kingdom ................ 423/244

Primary Examiner—O. R. Vertiz
Assistant Examiner—Gregory A. Heller

[57] ABSTRACT

Prevention of the formation of explosive mixtures by hydrogen leaking through valves into ducts normally containing quiescent flue gas containing oxygen is accomplished by maintaining a continuous flow of the flue gas sufficient to dilute the hydrogen.

4 Claims, 1 Drawing Figure

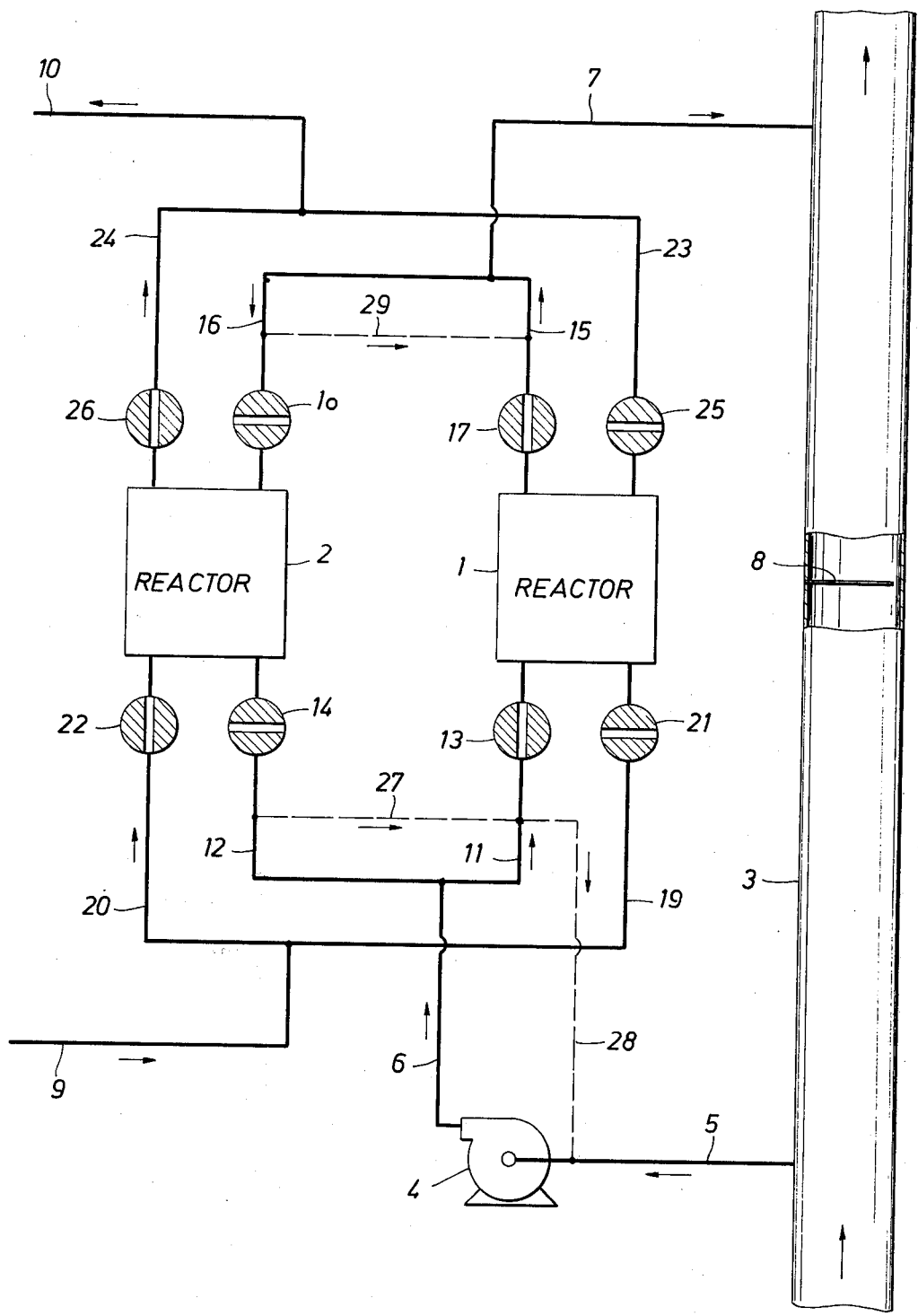

PREVENTION OF EXPLOSIVE MIXTURES IN THE REGENERATION OF SULFUR OXIDE ACCEPTORS

This is a continuation of application Ser. No. 555,322, filed Mar. 4, 1975, now abandoned.

BACKGROUND OF THE INVENTION

This invention relates to an improved process for the removal of sulfur dioxide from flue gas containing sulfur dioxide and other components, including oxygen.

In general, pollution control regulations now restrict severely the volume of sulfur compounds which may be discharged from furnace stacks. Because the flue gas from furnaces is generally the product of complete combustion in the presence of excess oxygen, the flue gas has an oxidative character, and the sulfur is present chiefly as sulfur dioxide. Various methods for the removal of sulfur dioxide from these streams have been proposed.

In one such method, sulfur dioxide is removed from the flue gas at elevated temperatures in the presence of a copper-containing solid acceptor. The copper acceptor binds the sulfur dioxide under oxidative conditions, with the formation of copper sulfate. One advantage of this process is that sulfur dioxide may be regenerated without addition of heat, by use of a reducing atmosphere. The acceptor is then again suitable for acceptance of sulfur dioxide. During regeneration, a regeneration off-gas becomes available which contains sulfur dioxide in much higher concentration than that of the flue gas. This sulfur dioxide may be recovered by known procedures. In the regenerated acceptor, the copper is in metallic and/or oxidic form. Any metallic copper present is re-oxidized in a subsequent acceptance period.

In the practice of this flue gas desulfurization process, use is made of reactors having separate inlet and outlet ducts for the flue gas and the reducing gas. These ducts or lines are provided with valves near the reactors for regulating the flow of the reactants. During the regeneration of the loaded acceptor, the valves in the inlet and outlet ducts for the reducing gas of the relevant reactor are open, and the valves in the inlet and outlet ducts for flue gas of that reactor are closed.

Because of the large volume of gas being treated, the relevant flue gas ducts will have a considerable diameter. Accordingly, valves having a large diameter must be used. In these valves, some leakage may occur locally.

During the regeneration of a loaded acceptor, the reducing gas flows on the reactor side of the valves in the flue gas inlet and outlet ducts. Flue gas leaking into the duct will not pose a problem, since it will immediately be removed. However, since the flue gas is stationary on the non-reactor side of the closed valves in the flue gas inlet and outlet ducts, any leak into the dead ends of these ducts may be sufficient to form an explosive mixture.

Although the flue gas ducts could be purged with steam or an inert gas, this method has several drawbacks, since special facilities are required therefor, such as a boiler and a separate duct system with valves. Moreover, the capacity of the flue gas desulfurization apparatus would be decreased by the steam or inert gas passing through the reactor when opened for flue gas.

Accordingly, the invention aims at eliminating this hazard and at providing economically attractive means to prevent the formation of explosive gas mixtures in the flue gas ducts.

SUMMARY OF THE INVENTION

The invention, therefore, relates to an improved process for the removal of sulfur dioxide from flue gas containing sulfur dioxide, as well as other components, including oxygen, wherein the flue gas is passed along an acceptor in a reactor at a temperature between 200° and 600° C, and, which acceptor contains copper and/or copper oxide on a refractory carrier, until the acceptor is saturated with sulfur dioxide accepted thereon, after which the saturated acceptor is regenerated at a temperature between 200° and 600° C by passing a reducing gas which contains at least hydrogen and a diluent through the reactor, while the flue gas is being passed through another reactor with regenerated acceptor. According to the invention, during the regeneration of the loaded acceptor, a stream of flue gas is passed through that part of the flue gas inlet, and preferably the outlet duct, of the relevant reactor which is located — viewed from the reactor — outside the valves.

A result of this provision is that in the event of a leaking valve, the hydrogen concentration in the flue gas-filled part of the flue gas duct cannot build up, since this leaked hydrogen is now continuously removed.

Those skilled in the art will recognize that it is not necessary that the flow of the purging stream of flue gas be terminated as soon as the regeneration of the acceptor in the relevant reactor is completed. Nor is it necessary that the flue gas inlet duct and/or the flue gas outlet duct be purged with desulfurized flue gas. It is advisable, of course, to guard against undesulfurized flue gas being discharged to the stack.

The separate flue gas inlet and outlet ducts of the various reactors are preferably designed as branches of a common flue gas supply duct and a common flue gas discharge duct, respectively. If this design is used, the latter two ducts need not be purged, since they are continuously connected to at least one open reactor.

According to the invention, a fraction of the quantity of flue gas which is passed through a reactor with regenerated acceptor is preferably first passed, during the regeneration of the acceptor which is present in another reactor, through that part of the flue gas inlet duct of the latter reactor which is located outside or upstream of the valve fitted therein. Since there will be an open connection between the flue gas inlet ducts of the above two reactors, no desulfurized flue gas can penetrate into these ducts and the open reactor, and no special provisions need be made for the supply of the flue gas to the closed flue gas inlet duct.

The invention is preferably applied to a process in which the flue gas to be desulfurized is passed from a furnace through a main flue gas duct and from this duct by means of a blower through a common flue gas duct to a branching inlet duct system for the reactors. In one embodiment, the flue gas which is passed through the upstream parts of the inlet duct of which the valves are closed is subsequently recycled to a point in the common flue gas duct located upstream of the blower. In this manner, a small part of the capacity of the blower is thus used to recycle flue gas. Since the quantity of recycled flue gas is invariably added to the total quantity of flue gas, the hydrogen concentration in the recycled gas is prevented from building up and the explosion hazard is reduced.

Preferably, a fraction of the quantity of flue gas which has been passed through a reactor with regenerated acceptor is passed, during the regeneration of the acceptor which is present in another reactor, through that part of the flue gas outlet duct of the latter reactor which is located outside (downstream) the valve provided in that flue gas outlet duct. In this manner, undesulfurized flue gas is prevented from reaching the stack, and, in addition, the direct connection between the various flue gas outlet ducts ensures the supply or discharge of the flue gas stream used for purging the closed ducts.

According to a preferred embodiment of the invention, the flue gas is passed from a point in the flue gas inlet and outlet duct, respectively, of a reactor of which the acceptor is being regenerated, to the same point in the flue gas inlet and outlet duct respectively of a reactor of which the acceptor is accepting sulfur dioxide from flue gas. Thus, the supply and discharge of the flue gas used for purging is simply arranged and no special pumps are required for passing the flue gas, due to the difference in pressure between the points in the open and closed inlet and outlet ducts, respectively.

According to a preferred embodiment of the invention, steam is injected by means of an ejector into the said fraction of desulfurized flue gas which is used for purging the flue gas outlet duct of a reactor which is being regenerated. The flow of the flue gas stream can thus be assisted, since the difference in pressure between the various flue gas outlet ducts may be rather low. In another embodiment, each reactor is purged with steam between the period in which the acceptor present therein is regenerated and the period in which this acceptor accepts sulfur dioxide from flue gas. This obviates the possibility of an explosive mixture forming within the reactor by mixing of the oxygen-containing flue gas and the hydrogen-containing regeneration gas.

It is to be noted that the explosion limits of gas mixtures containing hydrogen and oxygen become increasingly wide at higher temperatures, and extend virtually to 0 and 100% at about 500° C. This presents the disadvantage that mixtures containing, for example, 5% oxygen and 5% hydrogen ignite spontaneously at about 500° C, but form an explosive mixture at 400° C. Since both temperatures may occur in the noted process for the desulfurization of flue gas, the explosion hazard is quite real.

The concentration of the sulfur dioxide in the flue gas being treated is not critical. However, the invention is particularly adapted to a flue gas which has a sulfur dioxide content of less than 3% by volume, while the temperature of the flue gas and that of the acceptor during acceptance and regeneration preferably lies between 300° to 500° C. In the concentration and temperature range which is usual in the above embodiments, the explosion hazard is averted in an efficient manner.

The source of hydrogen or reducing gas for the regeneration step is a matter of choice. Preferably, however, the reducing gas required for the regeneration of the acceptor is obtained by the incomplete combustion of a fuel, followed by cooling the gas obtained and removal of at least a predominant part of the soot and/or ash with uncombusted carbon, the soot being combusted in the furnace from which the flue gas originates. An important advantage of this method of soot disposal is that no special apparatus for combusting or processing the soot is required.

The reducing gas which is used in the regeneration of the loaded acceptor preferably contains 1-20% by volume of hydrogen and/or carbon monoxide and at least 70% by volume of water vapor.

The incomplete combustion mentioned is effected preferably by supplying a fuel, oxygen or air and steam to a combustion chamber. In this manner, a reducing gas with a minimum percentage of soot and/or ash with uncombusted carbon is obtained. Moreover, the gas has a temperature sufficient to evaporate the required quantity of water therein, thus producing a reducing gas with the desired percentage of water vapor.

The invention also relates to an apparatus for the removal of sulfur dioxide from flue gas originating from a furnace, comprising two or more reactors filled with acceptor for sulfur dioxide, a main flue gas duct for the supply of the flue gas, which duct is provided with a blower and branches into flue gas inlet ducts to the various reactors, further comprising flue gas outlet ducts leading from the various reactors to a common flue gas ducts, which inlet and outlet ducts are provided with valves, as well as a separate inlet and outlet duct system for reducing gas, connected to the various reactors.

According to an embodiment of the invention, circulation ducts are provided between points in the flue gas inlet ducts, and preferably between points in the flue gas outlet ducts, respectively, which points, viewed from the reactors, are located immediately outside or upstream of the valves. This provision in itself is sufficient to ensure that a circulation of flue gas invariably occurs in the flue gas inlet and outlet duct, respectively, not connected to a reactor at that moment. Those skilled in the art will recognize that the pressure at a given point in the duct of which the valve is closed is invariably higher than the pressure in the duct of which the valve is not closed. The flue gas, therefore, flows from this point in the duct of which the valve is closed through the relevant circulation duct to the duct of which the valve is not closed, and subsequently further through the latter duct. Thus, any reducing gas leaking through the closed valve is immediately removed to the relevant circulation duct.

The circulation duct between the points in the flue gas inlet ducts is preferably, but not necessarily, as indicated previously, connected to a point in the main flue gas duct at the suction end of the blower. In this manner, a sufficient quantity of flue gas is passed through the flue gas inlet duct having the closed valve. This flue gas is again passed into the blower and, subsequently, the greater part of said flue gas flows through a reactor.

As also indicated, in order to make it possible to increase the degree of circulation in the flue gas outlet duct of which the valve is closed, a circulation duct is provided between points in the flue gas outlet ducts.

In order to illustrate the operation of the invention, attention is directed to the accompanying drawing. The drawing shows diagrammatically a flue gas desulfurization unit comprising two reactors 1 and 2, respectively. These reactors are filled with a copper-containing solid acceptor and connected, via valves, to two duct systems, a flue gas duct system and a regeneration gas duct system.

The flue gas originates from the main flue gas duct 3 which extends from the furnace to the stack and remains open when the desulfurization apparatus is disconnected. By means of the blower 4, flue gas is drawn through the duct 5 and passed to the reactor system through the duct 6. The flue gas, free of sulfur dioxide, returns from the reactor system to the main flue gas duct 3 through the duct 7. The baffle plate 8 and a pressure difference between the ducts 5 and 7 ensure that no sulfur dioxide-containing flue gas passes the baffle plate 8.

The steam- and hydrogen-containing regeneration gas is supplied to the reactor system through the duct 9, and the regeneration off-gas loaded with sulfur dioxide is discharged through the duct 10.

The duct 6 bifurcates into the two flue gas inlet ducts 11 and 12, which lead to the reactors 1 and 2, respectively, via the valves 13 and 14.

The duct 7 is connected to the two flue gas outlet ducts 15 and 16, which are connected to the outlets of the reactors 1 and 2, respectively, via the valves 17 and 18.

The duct 9 bifurcates into two regeneration gas inlet ducts 19 and 20, which lead to the reactors 1 and 2, respectively, via the valves 21 and 22.

Finally, the duct 10 is connected to the two regeneration off-gas ducts 23 and 24, which are connected to the outlets of the reactors 1 and 2, respectively, via the valves 25 and 26.

The valves 13, 17, 22 and 26 are shown in open position, and the valves 14, 18, 21 and 25 in closed position. In the situation shown, the reactor 2 is therefore connected to the duct system for regeneration gas, and the reactor 1 to the duct system for removal of sulfur dioxide from the flue gas.

According to the invention, a duct 27 is provided between points in the flue gas inlet ducts 11 and 12 immediately upstream or outside the valves 13 and 14 (viewed from the reactors). In addition, an extension 28 of duct 27 may be provided to a point in the flue gas duct 5 located upstream of the blower 4 to provide good circulation and dilution of the hydrogen-containing gas.

A duct 29 may be provided between the points in the flue gas outlet ducts 15 and 16 immediately downstream or outside the valves 17 and 18.

In the situation shown, the duct 27 ensures that regeneration (reducing) gas present in the reactor 2 and leaking through the valve 14 is removed from the duct 12. The duct 29 ensures that the regeneration gas present in the reactor 2 and leaking through the valve 18 is removed from the duct 16. When reactor 1 is being regenerated, valves 13, 17, 22 and 26 are closed, and valves 14, 18, 21 and 25 are open. Ducts 27 and 29 provide similar purging of the dead space near valves 13 and 17.

What is claimed is:

1. In a process wherein (A) a flue gas containing sulfur dioxide and oxygen is passed through a first inlet duct and open valve communicating therewith to a first reactor containing a copper-containing acceptor on a refractory carrier at a temperature of between 200° and 600° C, to remove sulfur dioxide from the flue gas, and then the purified flue gas is passed from the first reactor through an open valve communicating with a first outlet duct, and (B) wherein the valves communicating with the first inlet duct and the first outlet duct of said first reactor are closed, and the flue gas containing the sulfur dioxide and oxygen is then passed through another first inlet duct and open valve communicating therewith to a second reactor containing a copper-containing acceptor on a refractory carrier at a temperature between 200° and 600° C, to remove sulfur dioxide from the flue gas, and then the purified flue gas is passed from the second reactor through an open valve communicating with another first outlet duct, while, (C) concomitantly passing a hydrogen-containing gas through a second inlet duct and open valve communicating therewith to said first reactor at a temperature between 200° and 600° C to regenerate the acceptor and then passing the hydrogen-containing gas from said first reactor through an open valve-communicating with a second outlet duct, the improvement comprising, preventing hydrogen build-up from valve leakage into the first inlet duct of the first reactor during step (C) by passing a quantity of flue gas sufficient to prevent hydrogen build-up through the first inlet duct of the first reactor and then to the first inlet duct of the second reactor.

2. The method of claim 1 wherein hydrogen build-up from valve leakage into the first outlet duct of the first reactor during step (C) is prevented by passing flue gas from the first outlet duct of the second reactor through the first outlet duct of the first reactor.

3. The method of claim 1 wherein, during step (A), the valves communicating with the first inlet duct and the first outlet duct of the second reactor are closed, and hydrogen-containing gas is passed through the second inlet duct of said second reactor and through the second reactor at a temperature of between 200° and 600° C, to regenerate therefor the acceptor.

4. The method of claim 3 wherein hydrogen build-up from valve leakage into the first outlet duct of the first reactor during step (C) is prevented by passing flue gas from the first outlet duct of the second reactor through the first outlet duct of the first reactor.

* * * * *